Oct. 7, 1947.  E. H. CUSHMAN  2,428,409
PLUNGER TYPE ELECTRODE HOLDER
Filed May 21, 1945
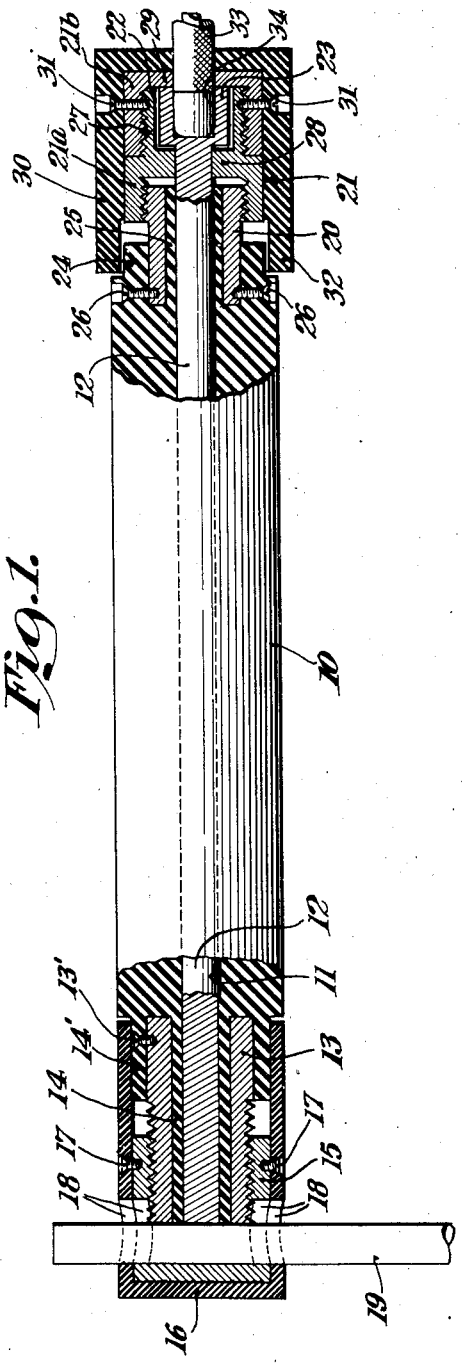
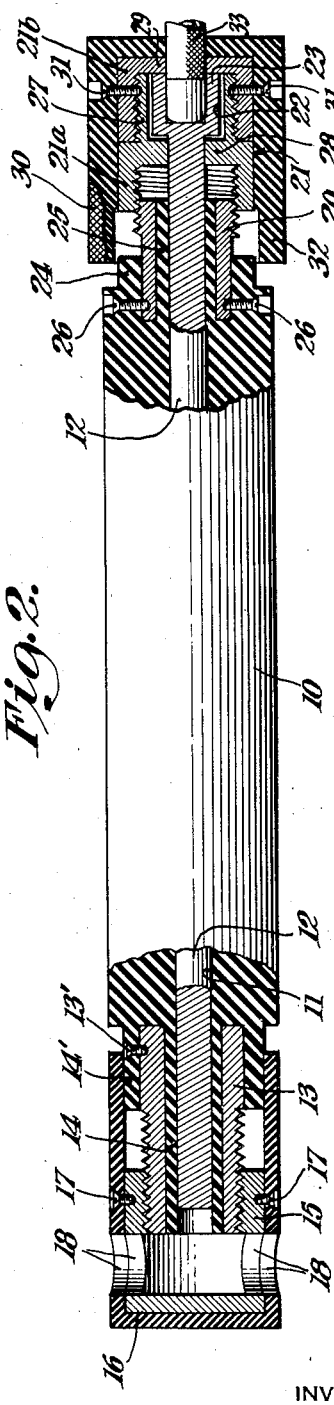
INVENTOR
*Everett H. Cushman*
BY
ATTORNEYS Patented Oct. 7, 1947

2,428,409

UNITED STATES PATENT OFFICE 2,428,409

PLUNGER TYPE ELECTRODE HOLDER

Everett H. Cushman, New York, N. Y., assignor to Air Reduction Company, Incorporated, a corporation of New York Application May 21, 1945, Serial No. 595,011

8 Claims. (Cl. 219—8)

1

This invention relates to improvements in electrode holders and more particularly to an improved plunger type electrode holder for use in arc welding operations.

In using electrode holders of this type, in arc welding, it is necessary to change electrodes when they are consumed, and according to the usual practice, the plunger of the holder is retracted with respect to the head to unclamp the electrode and the stub of the electrode is ejected. The operator inserts a new electrode by holding it in his gloved hand and inserting it between the clamping members of the holder. The electrode clamping means is "live" during this operation, and the glove serves to insulate the operator from the welding current. However, such practices are dangerous because the glove may be damaged or wet, or the operator may neglect to use the glove. The electric switch used in connection with such welding operations is usually so remote as to make it impracticable to shut off the current each time a new electrode is inserted.

Proposals have been made to provide electrode holders with switches so that the current may be turned off at the holder before changing electrodes. However, the heavy current carried by such electrode holders requires such a large contactor that any switch for this purpose must be so large as to be unwieldy if it is made a part of the holder. A remote switch operated from the holder would be impracticable and too expensive.

The primary object, therefore, of the present invention is to provide an improved plunger type electrode holder in which the problems presented above are overcome.

Another object of the invention is to provide an improved plunger type electrode holder for arc welding which is simple to operate and which will insure safety to the operator in changing electrodes.

According to the invention the electrode holder has a clamping head in which the electrode may be clamped and the parts of which are electrically insulated from the welding current when a current-carrying plunger is retracted so that it does not make contact with the electrode. Thus, when the current-carrying plunger is retracted, the electrode is dead and the clamping head may be safely operated to eject the electrode stub and to insert a new electrode, and thereafter the current-carrying plunger may be moved into contact with the electrode to supply welding current to it.

A plunger type electrode holder embodying the

2 invention is illustrated in the accompanying drawing, in which:

Fig. 1 is a side elevation, partly in vertical section, of the electrode holder with an electrode clamped in the head and the current-carrying plunger advanced into contact with the electrode; and Fig. 2 is a view similar to Fig. 1 showing the position of the various parts of the holder with the electrode removed and the current-carrying plunger retracted.

Referring to the drawing, the improved electrode holder comprises a relatively long body portion 10 of rigid insulating material which constitutes a hand grip. The body portion has an axial bore 11 in which a current-carrying plunger 12 is adapted to be moved axially by the means hereinafter described.

The clamping head includes an externally threaded metal sleeve 13 at the forward end of the body 10 inserted between annular projections 14 and 14' on the body, and held in fixed position in any suitable way, as by means of one or more countersunk screws 13'. The metal sleeve 13 terminates evenly with the end of the annular projection 14 and is completely insulated from the current-carrying plunger 12. The annular projection 14' projects only part way over the metal sleeve 13 so as not to cover the external threads on the sleeve. An internally threaded metal cap 15 turns on the externally threaded portion of the metal sleeve 13. A covering 16 of insulating material completely encases the cap 15 and extends over the annular projection 14' of the body 10 so that the metal members 13 and 15 are completely enclosed by insulating material. The covering 16 of insulating material may be secured to the metal cap 15 by means of countersunk screws 17. The cap 15 and the insulated covering 16 are provided with transverse holes or openings 18 which are diametrically opposite each other and which are adapted to receive the end of a welding electrode 19 (Fig. 1).

It will now be seen that when the cap 15 is turned on the threaded sleeve 13 to move the cap toward the left, as viewed in the drawing, to the position indicated in Fig. 2, the end of an electrode may be inserted in the openings 18, and then by turning the cap in the opposite direction, it will be moved to the right to clamp the electrode against the end of the metal sleeve 13, as shown in Fig. 1. Similarly, the electrode may be removed from the clamping head by turning the cap 15 to make it move toward the left and thereby release the electrode from its clamping engagement with the end of the metal sleeve 13. If, in removing and positioning the electrode the current-carrying plunger 12 is retracted to the position shown in Fig. 2, it is evident that the metal parts of the clamping head are dead and the electrode will also be dead and can therefore be safely handled in removing it and positioning it in the clamping head.

Any suitable means may be employed for retracting the current-carrying plunger 12 to the position shown in Fig. 2 and for moving in into contact with the electrode after the electrode is clamped in the clamping head. Preferably, such means comprises an externally threaded metal sleeve 20 at the rear end of the body portion 10 on which an internally threaded sleeve 21 turns. The sleeve 21 has an internal annular recess 22 in which an enlarged head 23 on the rear end of the plunger 12 loosely fits.

The externally threaded metal sleeve 20 is preferably associated with the body portion 10 by inserting its forward end between annular projections 24 and 25 on the body portion and securing it in fixed position by means of countersunk screws 26. The metal sleeve 21 is preferably made up of two parts, a main part 21a and a cap part 21b. The main part 21a has an externally threaded rearwardly projecting annular portion 27 encircling the enlarged head 23 of the plunger, and the cap part 21b is internally threaded and turns on the externally threaded portion 27. When the cap part 21b is screwed in place the enlarged head of the plunger is loosely confined between an inwardly projecting annular flange 28 on the main part 21a of the sleeve and the end wall 29 of the cap.

A covering 30 of insulating material encases the sleeve 21 and may be secured to it by countersunk screws 31. If desired, these screws may engage both the cap part 21b of the sleeve and the threaded portion 27 of the sleeve so that the screws will serve the additional purpose of locking the cap 21b in place after it is screwed onto the portion 27 to confine the head of the plunger. The insulating covering 30 has an annular projection 32 which overlaps the annular projection 24 on the body 10. If desired, the outer surface of the insulating covering may be knurled, or otherwise roughened, so that it may be turned like a knob. When turned in one direction it is apparent that sleeve 21 will turn with it, and by reason of the threaded connection between the sleeves 21 and 20 the sleeve 21 will move axially. The sleeve 21 will turn freely on the end of the plunger, but since the enlarged head 23 of the plunger is confined in the internal annular recess in the sleeve, the axial movement of the sleeve will shift the plunger axially in one direction or the other depending upon the direction in which the insulated covering 30 is turned.

A conductor 33 which is connected to a source of welding current, not shown, extends loosely through openings in the rear walls of the insulating covering 30 and the cap 21b and is electrically connected to the plunger 12 as by securing its end in an axial bore 34 in the rear end of the enlarged head of the plunger.

It will now be seen that the improved electrode holder is simple in construction and the electrode may be safely handled in removing or positioning it. To eject an electrode stub, the knob-like portion at the rear of the electrode holder, made up of the insulating covering 30 and the sleeve 21, is turned to retract the plunger to the position shown in Fig. 2. This disconnects the electrode from the welding circuit and renders it dead. The cap 15 at the clamping head may then be turned to release the electrode stub. A new electrode may then be inserted in the clamping head and clamped in position by turning the cap 15 in the opposite direction, and thereafter, the knob-like portion at the rear end of the electrode holder may be turned to bring the plunger into contact with the electrode and thereby connect it in the welding circuit. Since the parts of the clamping head are insulated from the welding current when the current-carrying plunger 12 is retracted, the parts of the clamping head and also the electrode, may be safely handled by the operator when removing an electrode or when inserting a new one, even when he does not use the customary glove.

I claim:

1. In a welding electrode holder of the plunger type, a body, a current-carrying plunger movable axially therein, clamping means at one end of said body for rigidly clamping an electrode independently of the plunger but in position to be contacted by one end of the plunger, and means for shifting the plunger axially to move its said end into and out of contact with the electrode, said clamping means being insulated from the welding current when the end of the current-carrying plunger is not in contact with the electrode and being capable of actuation to clamp the electrode independently of movement of said plunger.

2. In a welding electrode holder of the plunger type, a body, a current-carrying plunger movable axially therein, clamping means at the forward end of the body for rigidly clamping an electrode independently of the plunger but in position to be contacted by the forward end of the plunger, and means at the rear end of the body for shifting the plunger axially to move its forward end into and out of contact with the electrode, said clamping means being insulated from the welding current when the forward end of the plunger is not in contact with the electrode and being actuatable at the forward end of the body independently of said means for shifting the plunger axially.

3. In a plunger type welding electrode holder in which a current-carrying plunger contacts an electrode held in the holder, the improvement which comprises means for clamping an electrode in the holder independently of the plunger, means for reciprocating the plunger toward and away from the electrode, and means for insulating the electrode with respect to the plunger when the plunger is in retracted position, said means for clamping the electrode being actuatable to clamp the electrode independently of said means for reciprocating the plunger.

4. In a welding electrode holder of the plunger type, an elongated body of insulating material having an axial bore therethrough, a current-conducting plunger mounted for reciprocation in said bore, clamping means independent of the plunger for clamping an electrode across one end of said bore, and means at the end of said body opposite said electrode clamping means for advancing said plunger in said bore into contact with an electrode clamped in said clamping means and for retracting the plunger away from the electrode, said clamping means being insulated from the welding current when the plunger is not in contact with the electrode and being actuatable to clamp the electrode independently of said means for advancing the electrode.

5. In a welding electrode holder of the plunger type, an elongated body of insulating material having an electrode-clamping head at one end and a plunger-operating means at the other end, and a plunger extending axially through said body from said plunger-operating means and adapted to be shifted axially in the body by said means to move its end into and out of contact with the electrode, said clamping head having insulated parts in which an electrode can be clamped independently of the plunger and the plunger constituting the sole means for conducting current to an electrode clamped in said head, and the clamping head being actuatable to clamp the electrode independently of said plunger-operating means.

6. In a welding electrode holder of the plunger type, an elongated body of insulating material through which a current-carrying plunger extends, an electrode-clamping head at one end of said body comprising an internally threaded cap operating on an externally threaded part at one end of said body, an opening through said cap for the insertion of an electrode to be clamped against said part of the body, a covering of insulating material encasing said cap and its threaded connection with said part of the body, and independent means for moving said plunger into and out of contact with an electrode clamped in the clamping head.

7. In a welding electrode holder of the plunger type, an elongated insulated body member having a reciprocable plunger of current-conducting material mounted therein, means at one end of said insulated body for clamping an electrode against a part thereof and opposite the corresponding end of said plunger, plunger-actuating means having threaded connection with a part at the other end of the body member and engaging said plunger for reciprocating it into and out of contact with an electrode held in said clamping means, and a covering of insulating material encasing said plunger-actuating means, said means for clamping the electrode being actuatable to clamp the electrode independently of said plunger-actuating means.

8. A welding electrode holder comprising a body, a current-carrying plunger movable axially in the body, clamping means at one end of the body for clamping an electrode independently of the plunger, said means being insulated from the plunger when the plunger is out of contact with the electrode, and means for shifting the plunger axially to move its end into and out of contact with the electrode clamped in said clamping means, said clamping means being actuatable to clamp the electrode independently of said means for shifting the plunger axially.

EVERETT H. CUSHMAN.

REFERENCES CITED

The following references are of record in the file of this patent:

UNITED STATES PATENTS

| Number | Name | Date |
| --- | --- | --- |
| 1,552,476 | Erichson et al. | Sept. 8, 1925 |
| 1,561,055 | Callahan | Nov. 10, 1925 |
| 2,283,996 | Irwin et al. | May 26, 1942 |
| 2,233,618 | Leach | Mar. 4, 1941 |